(12) United States Patent
Shibano et al.

(10) Patent No.: US 11,611,234 B2
(45) Date of Patent: Mar. 21, 2023

(54) CONTROL METHOD, NON-TRANSITORY COMPUTER READABLE STORAGE MEDIUM AND CONTROL DEVICE IN COMMUNICATION WITH DISPLAY DEVICE TO DISPLAY POWER CONSUMPTION INFORMATION

(71) Applicant: TOYOTA JIDOSHA KABUSHIKI KAISHA, Aichi-ken (JP)

(72) Inventors: Takumi Shibano, Nagoya (JP); Kazutaka Kimura, Mishima (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 23 days.

(21) Appl. No.: 17/396,768

(22) Filed: Aug. 9, 2021

(65) Prior Publication Data
US 2022/0158486 A1 May 19, 2022

(30) Foreign Application Priority Data
Nov. 18, 2020 (JP) .............................. JP2020-192028

(51) Int. Cl.
*H02J 13/00* (2006.01)
*G05B 15/02* (2006.01)

(52) U.S. Cl.
CPC ........ *H02J 13/00001* (2020.01); *G05B 15/02* (2013.01)

(58) Field of Classification Search
CPC ........ H02J 13/00001; H02J 3/003; H02J 3/14; H02J 2310/14; H02J 2310/60; G05B 15/02; G05B 2219/2639; Y02B 90/20; Y04S 20/00
See application file for complete search history.

(56) References Cited

U.S. PATENT DOCUMENTS

| | | | | |
|---|---|---|---|---|
| 10,139,437 B2 * | 11/2018 | Choe | .................... | G01R 21/133 |
| 10,191,459 B2 * | 1/2019 | Oono | ...................... | B60L 55/00 |
| 11,482,861 B2 * | 10/2022 | Choe | .................... | G06Q 30/018 |
| 2009/0094473 A1 * | 4/2009 | Mizutani | ............... | G06F 1/3203 |
| | | | | 713/340 |
| 2011/0172841 A1 * | 7/2011 | Forbes, Jr. | ............. | G06Q 10/06 |
| | | | | 700/297 |
| 2012/0083927 A1 * | 4/2012 | Nakamura | ............... | F24F 11/64 |
| | | | | 700/278 |
| 2014/0018967 A1 * | 1/2014 | Sako | ................. | H02J 13/00028 |
| | | | | 700/291 |

(Continued)

FOREIGN PATENT DOCUMENTS

JP 2014131447 A 7/2014

*Primary Examiner* — Ramesh B Patel
(74) *Attorney, Agent, or Firm* — Hauptman Ham, LLP

(57) ABSTRACT

A control device is connected to power loads installed in a consumer facility so as to be able to communicate with the power loads. The control device includes: a control unit; and a display unit. The control unit determines the power loads and predicted power consumption when the power loads are used, determines at least one usable power load out of the power loads based on a remaining amount of available electric power in the consumer facility and the predicted power consumption, displays the usable power load on the display unit such that the usable power load is selectable, and controls use of the selected power load.

20 Claims, 5 Drawing Sheets

(56) References Cited

U.S. PATENT DOCUMENTS

| | | | |
|---|---|---|---|
| 2014/0188299 A1* | 7/2014 | Odakura | G05B 15/02 700/297 |
| 2014/0222230 A1* | 8/2014 | Shimizu | G06Q 50/06 700/291 |
| 2014/0336837 A1* | 11/2014 | Kiuchi | H02J 13/00001 700/295 |
| 2014/0371942 A1* | 12/2014 | Matsuyama | H02J 3/14 700/297 |
| 2015/0355246 A1* | 12/2015 | Choe | G01R 21/133 702/60 |
| 2015/0355247 A1* | 12/2015 | Choe | G06Q 30/02 702/60 |
| 2016/0004297 A1* | 1/2016 | Kazuno | H02J 7/34 713/320 |
| 2019/0176640 A1* | 6/2019 | Lee | B60K 35/00 |
| 2022/0224112 A1* | 7/2022 | Ehara | H02J 3/14 |

* cited by examiner

| POWER LOAD ID | PREDICTED POWER CONSUMPTION |
|---|---|
| L01 | 200 |
| L02 | 20 |
| L03 | 600 |
| L04 | 600 |
| ⋮ | ⋮ |

CONTROL METHOD, NON-TRANSITORY COMPUTER READABLE STORAGE MEDIUM AND CONTROL DEVICE IN COMMUNICATION WITH DISPLAY DEVICE TO DISPLAY POWER CONSUMPTION INFORMATION

CROSS-REFERENCE TO RELATED APPLICATION

This application claims priority to Japanese Patent Application No. 2020-192028 filed on Nov. 18, 2020, incorporated herein by reference in its entirety.

BACKGROUND

1. Technical Field

The present disclosure relates to a control device, a program, and a control method.

2. Description of Related Art

A technique for displaying electric device icons and power consumption thereof has been known (for example, Japanese Unexamined Patent Application Publication No. 2014-131447 (JP 2014-131447 A)). When an electric device icon is selected, the setting screen for the electric device corresponding to the icon is displayed, so that operation or stop of the electric device can be set.

SUMMARY

For example, in the event of a disaster or a demand response, available electric power in a consumer facility is limited. With the above-mentioned technology of JP 2014-131447 A, only the current power consumption of each device is displayed, and it is not possible to determine whether the device can be used.

An object of the present disclosure made in view of such circumstances is to provide a control device, a program, and a control method that make it possible to easily understand which device is usable.

A control device according to an embodiment of the present disclosure is connected to power loads installed in a consumer facility so as to be able to communicate with the power loads. The control device includes: a control unit; and a display unit. The control unit determines the power loads and predicted power consumption when the power loads are used, determines at least one usable power load out of the power loads based on a remaining amount of available electric power in the consumer facility and the predicted power consumption, displays the usable power load on the display unit such that the usable power load is selectable, and controls use of the selected power load.

A program according to an embodiment of the present disclosure causes a computer serving as a control device that is connected to power loads installed in a consumer facility so as to be able to communicate with the power loads, to perform operations including: determining the power loads and predicted power consumption when the power loads are used; determining at least one usable power load out of the power loads based on a remaining amount of available electric power in the consumer facility and the predicted power consumption; displaying the usable power load on a display unit such that the usable power load is selectable; and controlling use of the selected power load.

A control method according to an embodiment of the present disclosure is executed by a control device that is connected to power loads installed in a consumer facility so as to be able to communicate with the power loads. The control method includes: determining the power loads and predicted power consumption when the power loads are used; determining at least one usable power load out of the power loads based on a remaining amount of available electric power in the consumer facility and the predicted power consumption; displaying the usable power load on a display unit such that the usable power load is selectable; and controlling use of the selected power load.

According to a control device, a program, and a control method according to an embodiment of the present disclosure, it is possible to easily understand which device is usable.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
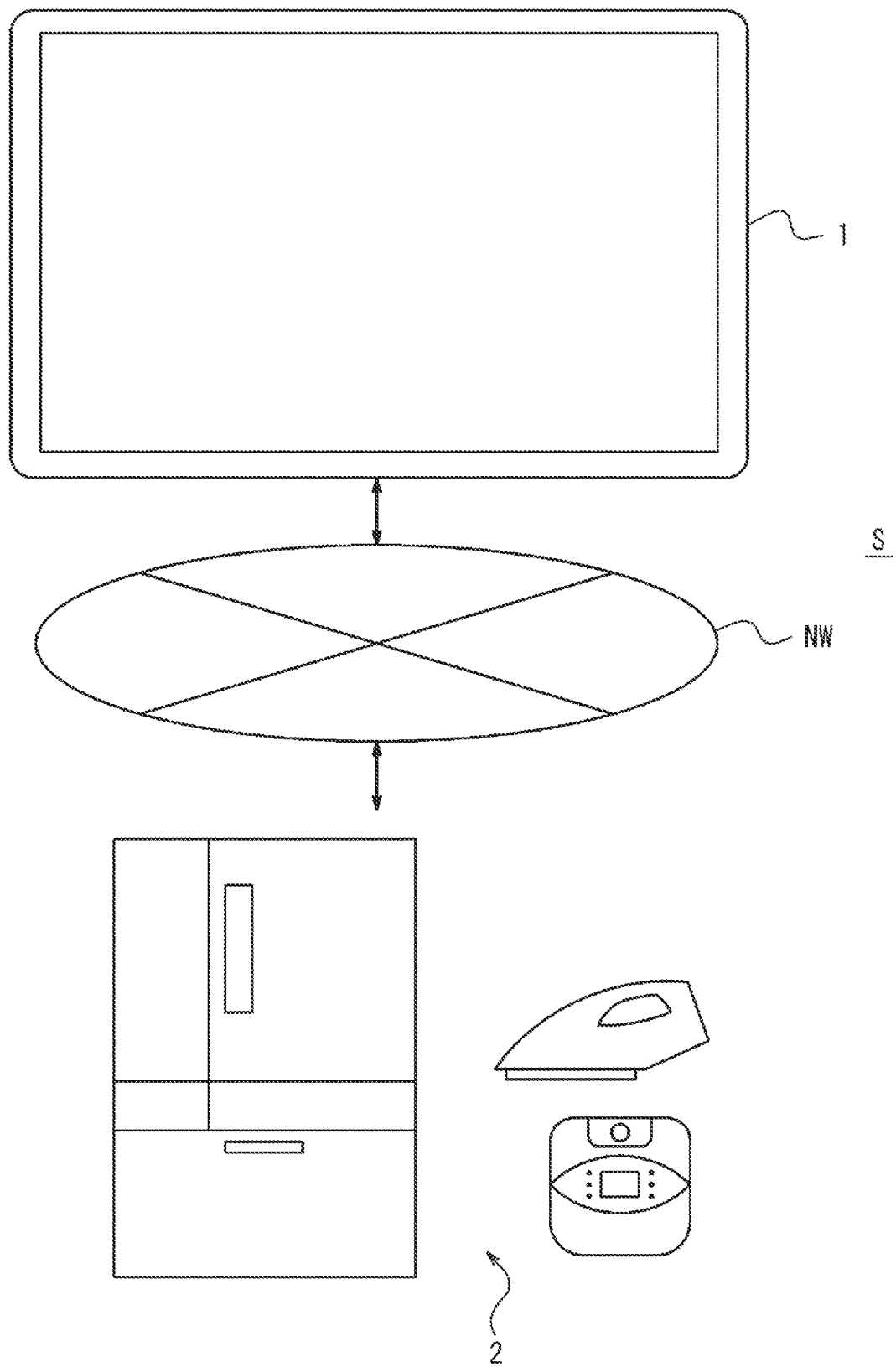
FIG. 1 is a schematic diagram of an information processing system.

FIG. 1 is a schematic view of an information processing system S according to the present embodiment. The information processing system S includes a control device 1 and power loads 2 that are connected so as to be able to communicate with each other via a network NW. The network NW includes, for example, a mobile communication network and the Internet.

In FIG. 1, for convenience of description, one control device 1 is illustrated. However, the number of control devices 1 is not limited to this. For example, the processes executed by the control device 1 according to the present embodiment may be executed by a plurality of the control devices 1 disposed in a distributed manner. In FIG. 1, three power loads 2 are shown. However, the number of power loads 2 connected to the network NW is not limited.

The outline of the processes executed by the control device 1 according to the present embodiment will be described. A control unit 11 of the control device 1 determines the power loads 2 and predicted power consumption when the power loads 2 are used, and determines at least one usable power load 2 out of the power loads 2 based on the remaining amount of available electric power in a consumer facility and the predicted power consumption. The control unit 11 displays the usable power load 2 on the display unit such that the power load 2 is selectable, and controls the use of the selected power load 2. With this configuration, the control device 1 allows the user to easily understand which power load 2 is usable. Therefore, the control device 1 can improve the convenience of the user. In addition, the control device 1 can reduce the possibility of blackout (power outage) in the entire city.

The control device 1 is a terminal operated by the user. The control device 1 is provided in the consumer facility. The consumer facility may be, for example, a house, an office, or a factory. The control device 1 is, for example, a mobile device such as a mobile phone, a smartphone, a wearable device, or a tablet. The control device 1 may be, for example, a general-purpose device such as a PC, or a dedicated device. The term "PC" is an abbreviation for "personal computer".

The control device 1 can control use and stop of the power loads 2. The control device 1 may be a so-called smart meter, an energy management system (EMS), or a power conditioning system (PCS).

The internal configuration of the control device 1 will be described in detail with reference to FIG. 2.

The control device 1 includes the control unit 11, a communication unit 12, a storage unit 13, an input-output unit 14, and an imaging unit 15. The components of the control device 1 are connected so as to be able to communicate with each other via a dedicated line, for example.

The control unit 11 includes, for example, one or more general-purpose processors including a central processing unit (CPU) or a micro processing unit (MPU). The control unit 11 may include one or more dedicated processors specialized for a specific process. The control unit 11 may include one or more dedicated circuits instead of including the processor. The dedicated circuit may be, for example, a field-programmable gate array (FPGA) or an application-specific integrated circuit (ASIC). The control unit 11 may include an electronic control unit (ECU).

The communication unit 12 includes a communication module conforming to one or more wired or wireless local area network (LAN) standards for connecting to the network NW. The communication unit 12 may include a module conforming to one or more mobile communication standards such as the long term evolution (LTE), the fourth generation (4G), or the fifth generation (5G). The communication unit 12 may include a communication module and the like conforming to one or more short-range communication standards or specifications including Bluetooth (registered trademark), AirDrop (registered trademark), infrared data association (IrDA), ZigBee (registered trademark), FeliCa (registered trademark), or radio frequency identifier (RFID). The communication unit 12 transmits and receives information via the network NW.

The storage unit 13 includes a semiconductor memory, a magnetic memory, an optical memory, or a combination of at least two of them. However, the disclosure is not limited to this. The semiconductor memory is, for example, a random access memory (RAM) or a read-only memory (ROM). The RAM is, for example, a static random access memory (SRAM) or a dynamic random access memory (DRAM). The ROM is, for example, an electrically erasable programmable read-only memory (EEPROM). The storage unit 13 may function as, for example, a main storage device, an auxiliary storage device, or a cache memory. The storage unit 13 may store information on the result of analysis or processing by the control unit 11. The storage unit 13 may store various information and the like related to the operation or control of the control device 1. The storage unit 13 may store a system program, an application program, embedded software, and the like. The storage unit 13 includes a predicted power consumption database (DB), which will be described later.

The input-output unit 14 includes at least one input interface. The input interface is, for example, a physical key, a capacitive key, a pointing device, a touch screen integrated with a display, or a microphone. The input-output unit 14 accepts an operation of inputting information used for the operation of the control device 1. The input-output unit 14 may be connected to the control device 1 as an external input device instead of being provided in the control device 1. As a connection method, for example, any method such as a USB, HDMI (registered trademark), or Bluetooth (registered trademark) can be used. The term "USB" is an abbreviation for "universal serial bus". The term "HDMI (registered trademark)" is an abbreviation for "high-definition multimedia interface".

The input-output unit 14 includes at least one output interface. The output interface is, for example, a display or a speaker. The display is, for example, an LCD or an organic EL display. In the present embodiment, the input-output unit 14 is also referred to as a display unit. The term "LCD" is an abbreviation for "liquid crystal display". The term "EL" is an abbreviation for "electroluminescence". The input-output unit 14 outputs the information obtained through the operation of the control device 1. The input-output unit 14 may be connected to the control device 1 as an external output device instead of being provided in the control device 1. As a connection method, for example, any method such as the USB, HDMI (registered trademark), or Bluetooth (registered trademark) can be used.

The imaging unit 15 includes a camera and can capture an image of the surroundings. The imaging unit 15 may record the captured image in the storage unit 13 or transmit the image to the control unit 11 for analysis.

The electric power loads 2 are electronic devices that consume the supplied electric power. The electric power loads 2 here are home appliances (that is, household electric appliances). The power loads 2 may be, for example, a refrigerator, an electric fan, a microwave oven, a rice cooker, an air conditioner, an electric iron, a vacuum cleaner, a light bulb, an electric lamp, a dryer, or a washing machine.

Hereinafter, the processes executed by the information processing system S according to the present embodiment will be described in detail. Here, as an example, a scene in which the user operates the control device 1 to control the use of the power loads 2 will be described.

The control device 1 determines, for each of one or more power loads 2 connected to the control device 1, the predicted power consumption when the power load 2 is used. The predicted power consumption may be stored in the storage unit 13 in advance, or may be predicted from the actual power consumption in the past.

Figures 2, 3:
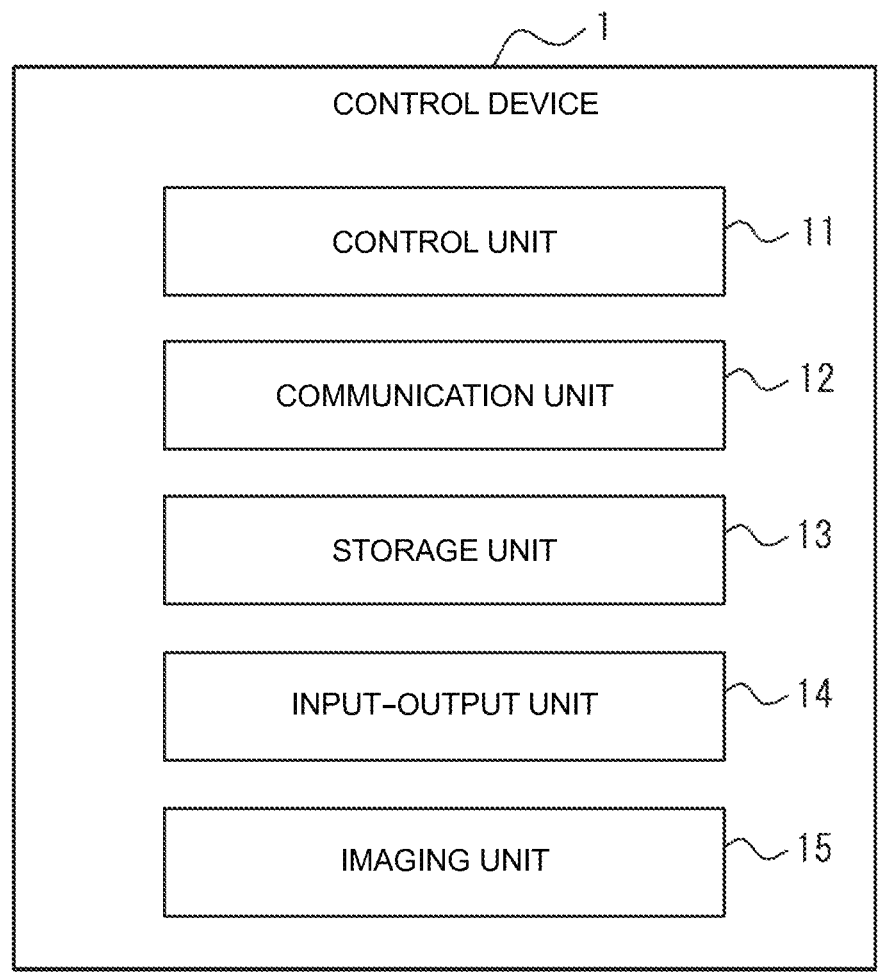
FIG. 2 is a block diagram showing a configuration of a control device.
FIG. 3 is a diagram showing a data structure of a predicted power consumption database (DB)

As shown in FIG. 3, the control device 1 associates an identifier of each of the power loads 2 (corresponding to "power load ID" in FIG. 3) with the predicted power consumption determined for each of the power loads 2 (corresponding to "estimated power consumption" in FIG. 3), and stores the identifier and the predicted power consumption in the predicted power consumption DB.

The control device 1 determines the remaining amount of available electric power in the consumer facility provided with the electric power loads 2. For example, the control device 1 determines the remaining amount of available electric power by subtracting the currently used electric power from the upper limit value of the available electric power in the consumer facility. The upper limit value of the available electric power is a value set in advance by an electric power company or the like, and is stored in advance in, for example, the storage unit 13. Here, for convenience of description, a case where the remaining amount of available electric power is 600 watts ([W]) will be described. As an alternative example, the remaining amount of available electric power may be a different value. The unit of electric power may be kilowatt hours ([kwh]) or Joules ([J]).

Figure 4:
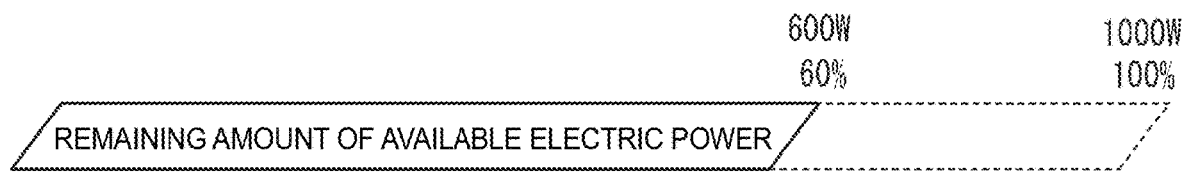
FIG. 4 is a diagram showing a first example of a display screen.

When the control device 1 determines the remaining amount of available electric power, the control device 1 may display the ratio of the remaining amount of available electric power to the upper limit value of the available electric power on the input-output unit 14, as shown in FIG. 4. In the example shown in FIG. 4, the upper limit value of the available electric power is 1000 watts. Of that, the remaining amount of available electric power is 600 watts. That is, 60% of the available electric power remains.

Figure 5:
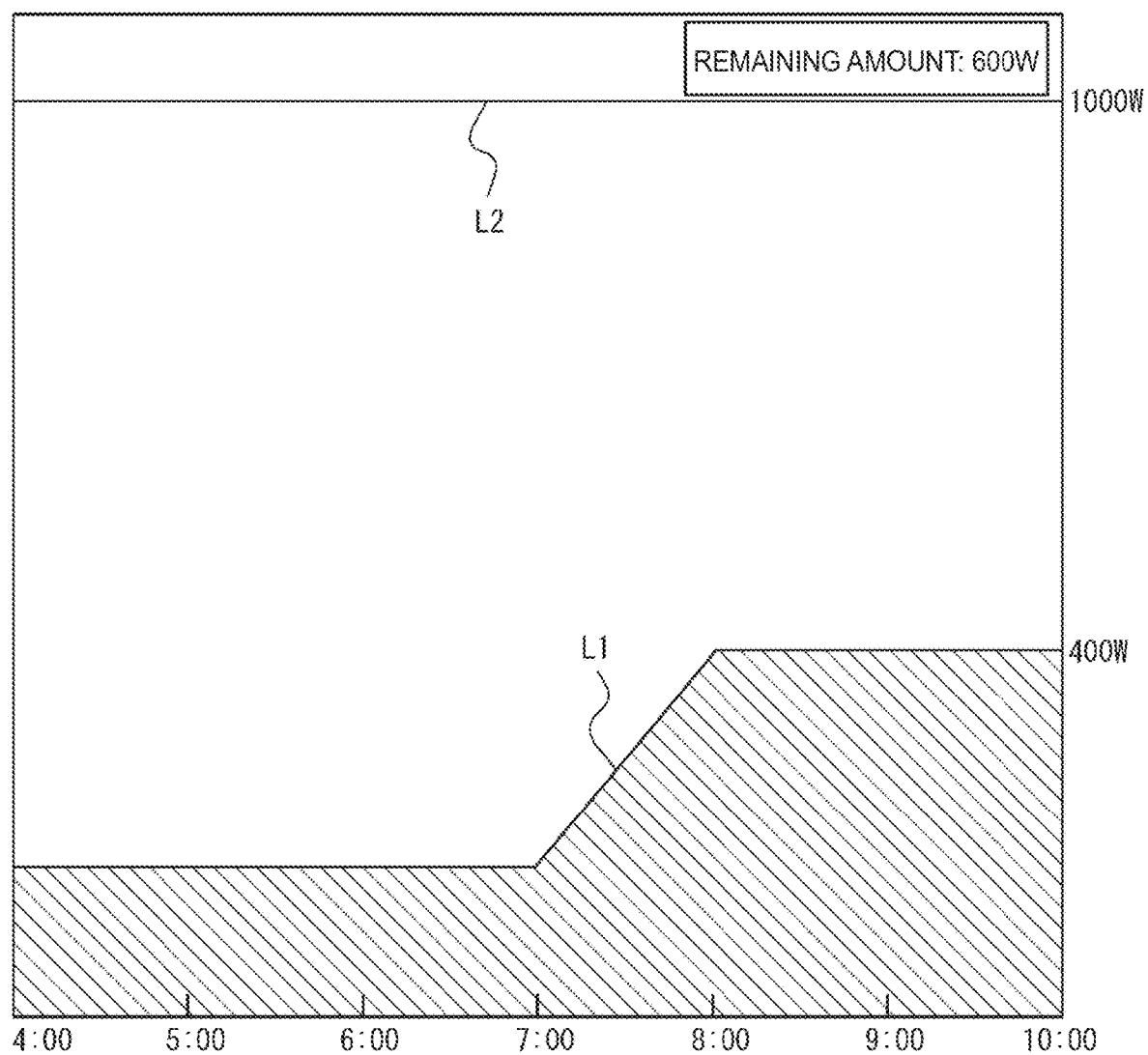
FIG. 5 is a diagram showing a second example of the display screen.

As an alternative example, as shown in FIG. 5, the control device 1 may display a graph L1 indicating the value of the electric power in use and a graph L2 indicating the upper limit value of the available electric power on the input-output unit 14. The horizontal axis represents time. The vertical axis represents the value of the electric power. As shown in FIG. 5, the value of the electric power in use is 400 watts. The upper limit value of the available electric power is 1000 watts. Therefore, the remaining amount of available electric power is calculated by the following equation.

$$1000-400=600[\text{Watts}]$$

The control device 1 compares the remaining amount of available electric power with the predicted power consumption associated with each of the power loads 2. The control device 1 determines at least one power load 2 associated with the predicted power consumption that does not exceed the remaining amount of available electric power to be the usable power load 2. In the example of FIG. 3, power loads L01 to L04 all have a predicted power consumption of 600 watts or less. Therefore, the control device 1 determines all the power loads L01 to L04 to be the usable power loads. As an alternative example, the control device 1 may execute the determination process so as not to use up all the remaining amount of available electric power. Specifically, the control device 1 may determine the power load 2 associated with the predicted power consumption that does not exceed the value obtained by subtracting a predetermined value from the remaining amount of available electric power to be the usable power load 2.

Figure 6:
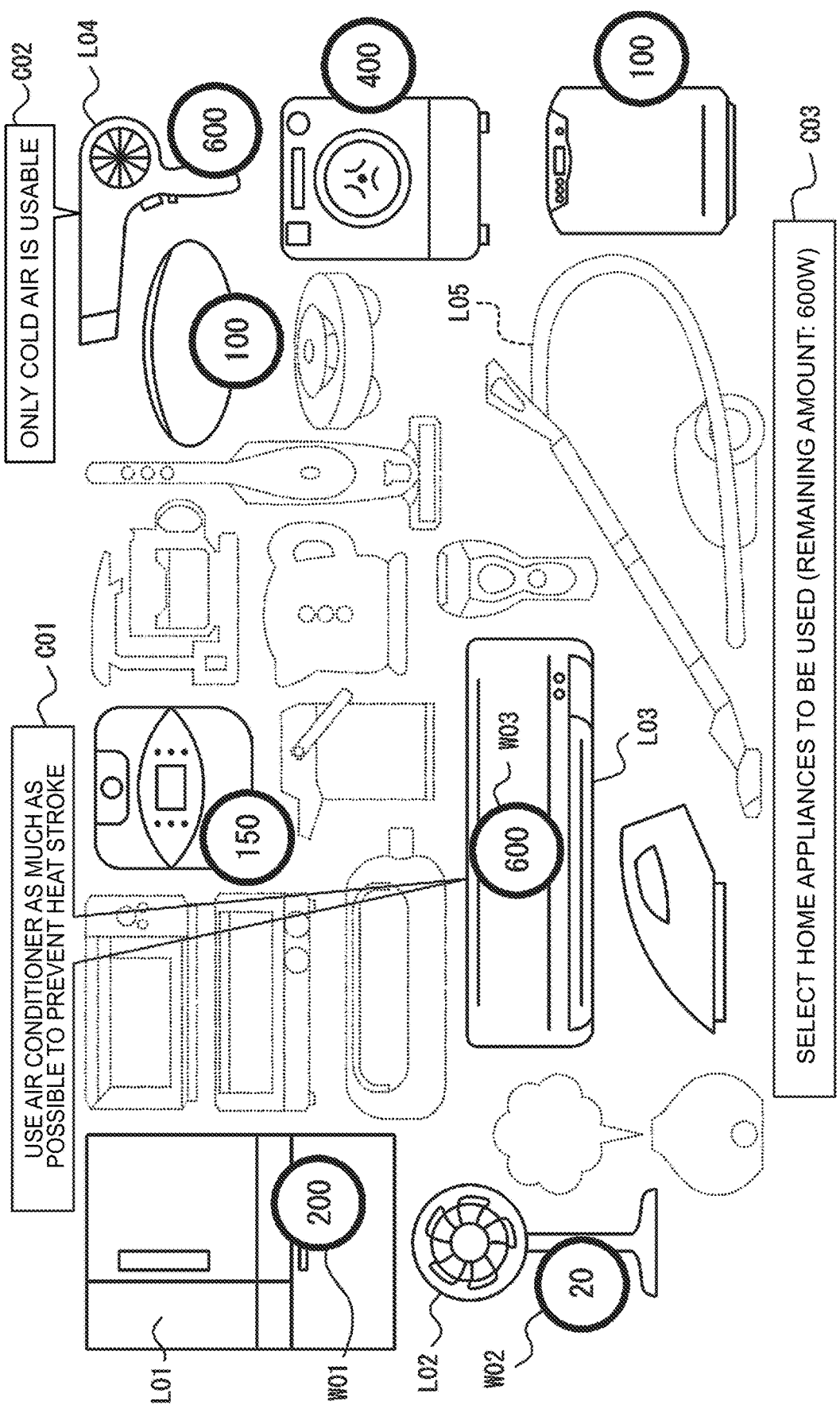
FIG. 6 is a diagram showing an example of a screen on which power loads are displayed so as to be selectable.

As shown in FIG. 6, the control device 1 displays all the power loads 2 connected to the control device 1 on the input-output unit 14. As an alternative example, only the currently unused power loads 2 may be displayed.

The control device 1 displays the usable power loads 2 and unusable power loads 2 on the input-output unit 14 so as to be distinguishable. In the example shown in FIG. 6, the power loads L01 to L04 are usable, so the power loads L01 to L04 are indicated with solid lines. Other usable power loads 2 are also indicated with solid lines. Since the power load L05 is unusable, the power load L05 is indicated lightly with a broken line. Other unusable power loads 2 are also indicated with broken lines. As an alternative example, the usable power loads L01 to L04 may be indicated in color and the unusable power load L05 may be indicated in black or gray.

As shown in FIG. 6, the usable power loads L01 to L03 may be indicated in association with the predicted power consumptions W01 to W03, respectively. The predicted power consumptions W01 to W03 may be indicated with circled numbers. The indication of the predicted power consumption is not associated with the unusable power load L05.

The control device 1 can display an annotation C03 on the input-output unit 14. As shown by the annotation C03, the control device 1 displays content prompting the user to select a power load 2 to be used (corresponding to the "home appliance"). The annotation C03 may further include the remaining amount of available electric power (corresponding to "600 W"). The usable power loads 2 are displayed so as to be selectable. The input-output unit 14 receives a user selection.

The control device 1 can display the annotations C01 and C02 regarding the power loads 2 on the input-output unit 14. The annotation C01 is displayed in association with the power load L03. The annotation C01 includes an indication prompting the use of the power load L03. The annotation C02 is displayed in association with the power load L04. When the power load L04 is usable only in some modes (for example, cold air mode) and unusable in other modes (for example, warm air mode), the annotation C02 includes an indication that the power load L04 is usable only in some modes.

As an alternative or additional example, when the power load L01 that is a refrigerator is usable only at a set temperature higher than a predetermined value, the annotation associated with the power load L01 may include an indication that the power load L01 is only usable at the set temperature higher than the predetermined value.

The control device 1 accepts the selection with respect to the usable power loads 2 by the user at the input-output unit 14. The control device 1 controls the use of the selected power load 2. For example, the control device 1 activates or operates the selected power load 2.

After the power load 2 is selected, the control device 1 can update and display the remaining amount of available electric power.

In another embodiment, the control device 1 may accept the stop of the power load 2. That is, the control device 1 stops the selected power load 2.

When the control device 1 is a mobile terminal, the imaging unit 15 of the control device 1 is carried by the user to capture an image of a power load 2. For example, when the imaging unit 15 captures an image of the power load L01, the control device 1 uses the augmented reality function to superimpose information indicating whether the power load L01 is usable on the image of the power load L01. In the present embodiment, the power load L01 is usable. The control device 1 may display the power load L01 on the input-output unit 14 such that the power load L01 is selectable.

Figure 7:
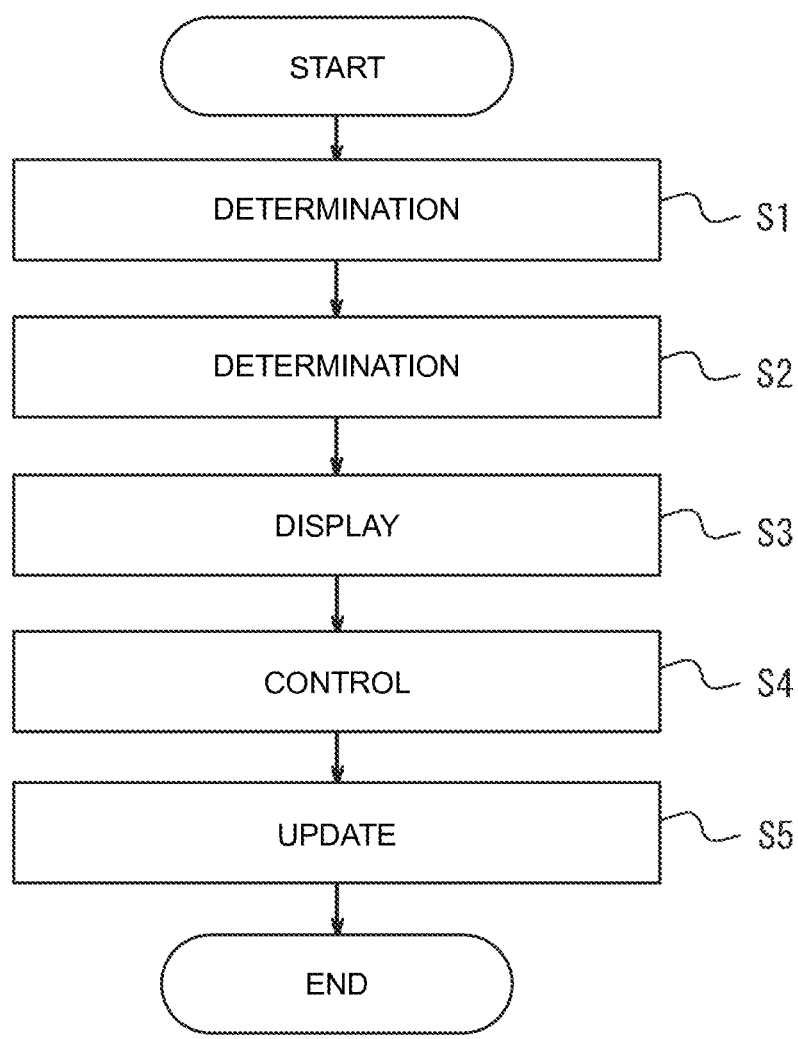
FIG. 7 is a flowchart showing operations of the control device.

A control method executed by the control device 1 according to the present embodiment will be described with reference to FIG. 7.

In step S1, the control device 1 determines the power loads 2 and the predicted power consumption when the power loads 2 are used.

In step S2, the control device 1 determines at least one usable power load 2 based on the remaining amount of available electric power and the predicted power consumption.

In step S3, the control device 1 displays the power load 2 determined to be usable on the input-output unit 14 such that the power load 2 is selectable.

In step S4, the control device 1 controls the use of the selected power load 2.

In step S5, the control device 1 updates the remaining amount of available electric power.

As described above, according to the present embodiment, the control device 1 determines the power loads 2 and the predicted power consumption when the power loads 2 are used, and determines at least one usable power load 2 out of the power loads 2 based on the remaining amount of available electric power in the consumer facility and the predicted power consumption. The control unit 11 displays the usable power load 2 on the display unit such that the power load 2 is selectable, and controls the use of the selected power load 2. With this configuration, the control unit 11 allows the user to easily understand which power load 2 is usable, and can accept the selection for use. Therefore, the control device 1 can improve the convenience of the user.

Further, according to the present embodiment, the control unit 11 displays on the input-output unit 14 the usable power load 2 and the annotation regarding the usable power load 2 in association with each other. With this configuration, the control unit 11 can convey information about the power load 2 to the user, so that the convenience of the user can be improved.

Further, according to the present embodiment, the annotation includes an indication prompting the use of the power load 2 associated with the annotation. The annotation includes an indication that the power load associated with the annotation is only usable in some modes. With this configuration, the control unit 11 can inform the user whether the power load 2 should be used and how to use the power load 2. Therefore, the control unit 11 can further improve the convenience of the user.

Further, according to the present embodiment, the control unit 11 displays the remaining amount of available electric power on the display unit, and after the power load 2 is selected, updates the displayed remaining amount of available electric power. With this configuration, the control unit 11 can convey the latest information to the user.

Further, according to the present embodiment, the control unit 11 displays on the display unit the ratio of the remaining amount of available power consumption to the upper limit value of the available power consumption in the consumer facility. With this configuration, the control unit 11 can inform the user how much the remaining amount remains.

Further, according to the present embodiment, the control device 1 is a mobile terminal. The control device 1 further includes the imaging unit 15. The control unit 11 uses the augmented reality function to superimpose the information indicating whether the power load 2 is usable on the image of the power load 2 that is captured by the imaging unit 15. With this configuration, the control device 1 allows the user to determine whether to use the power load 2 while looking at the actual power load 2.

Although the present disclosure has been described above based on the drawings and the embodiment, it should be noted that those skilled in the art may make various modifications and alterations thereto based on the present disclosure. Other changes may be made without departing from the scope of the present disclosure. For example, the functions included in each unit or step can be rearranged so as not to be logically inconsistent, and a plurality of units or steps can be combined into one or divided.

For example, in the above embodiment, a program that executes all or part of the functions or processes of the control device 1 can be recorded in a computer-readable recording medium. The computer-readable recording medium includes a non-transitory computer-readable medium such as a magnetic recording device, an optical disc, a magneto-optical recording medium, or a semiconductor memory. The distribution of the program is carried out, for example, by selling, transferring, or renting a portable recording medium such as a digital versatile disc (DVD) or a compact disc read-only memory (CD-ROM) on which the program is recorded. Further, the distribution of the program may be performed by storing the program in a storage of a server and transmitting the program from the server to another computer. Further, the program may be provided as a program product. The present disclosure can also be realized as a program that can be executed by a processor.

The computer temporarily stores the program recorded in the portable recording medium or the program transferred from the server in the main storage device, for example. The computer then causes the processor to read the program stored in the main storage device, and causes the processor to execute processes in accordance with the read program. The computer may read the program directly from the portable recording medium and execute processes in accordance with the program. The computer may execute the processes in accordance with the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the processing of the computer corresponds to the "data equivalent to a program".

What is claimed is:

1. A control device that is connected to power loads installed in a consumer facility so as to be communicable with the power loads, the control device comprising:
   a control unit; and
   a display unit, wherein
   the control unit is configured to
      determine the power loads based on the connection with the power loads,
      associate each power load of the power loads with predicted power consumption stored in a memory, the predicted power consumption defined as a power consumption predicted when said power load of the power loads is used,
      calculate a remaining amount of available electric power based on a difference between currently used electric power and a predetermined value of available electric power in the consumer facility,
      determine at least one usable power load out of the power loads based on the remaining amount of available electric power in the consumer facility and the predicted power consumption,
      cause the display unit to display the at least one usable power load such that the at least one usable power load is selectable, and
      in response to receiving a selection of the displayed at least one usable power load, control the selected at least one usable power load.

2. The control device according to claim 1, wherein the control unit is configured to cause the display unit to display the at least one usable power load and an annotation regarding the at least one usable power load in association with each other.

3. The control device according to claim 2, wherein the annotation includes an indication prompting the use of the at least one usable power load associated with the annotation.

4. The control device according to claim 2, wherein the annotation includes an indication that the at least one usable power load associated with the annotation is usable only in some, but not all, modes.

5. The control device according to claim 1, wherein the control unit is configured to
  cause the display unit to display the remaining amount of available electric power, and
  update the displayed remaining amount of available electric power in response to the selection of the displayed at least one usable power load.

6. The control device according to claim 1, wherein the control unit is configured to cause the display unit to display a ratio of a remaining amount of available power consumption to an upper limit value of the available power consumption in the consumer facility.

7. The control device according to claim 1, wherein:
  the control device is a mobile terminal;
  the control device further includes an imaging unit; and
  the control unit is configured to
    associate a power load captured by the imaging unit with the predicted power consumption stored in the memory,
    determine whether the power load captured by the imaging unit is usable based on the remaining amount of available electric power and the predicted power consumption of the power load captured by the imaging unit, and
    use an augmented reality function to superimpose, on an image of the power load captured by the imaging unit, information indicating whether the power load captured by the imaging unit is usable.

8. A non-transitory computer readable storage medium storing a program which, when executed by a computer serving as a control device that is connected to power loads installed in a consumer facility so as to be communicable with the power loads, causes the computer to perform operations including:
  determining the power loads based on the connection with the power loads;
  associating each power load of the power loads with predicted power consumption stored in a memory, the predicted power consumption defined as a power consumption predicted when said power load of the power loads is used;
  calculating a remaining amount of available electric power based on a difference between currently used electric power and a predetermined value of available electric power in the consumer facility;
  determining at least one usable power load out of the power loads based on the remaining amount of available electric power in the consumer facility and the predicted power consumption;
  causing a display unit to display the at least one usable power load such that the at least one usable power load is selectable; and
  in response to receiving a selection of the displayed at least one usable power load, controlling the selected at least one usable power load.

9. The non-transitory computer readable storage medium storing the program according to claim 8, which, when executed by the computer, causes the computer to further perform an operation of causing the display unit to display the at least one usable power load and an annotation regarding the at least one usable power load in association with each other.

10. The non-transitory computer readable storage medium storing the program according to claim 9, wherein the annotation includes an indication prompting the use of the at least one usable power load associated with the annotation.

11. The non-transitory computer readable storage medium storing the program according to claim 9, wherein the annotation includes an indication that the at least one usable power load associated with the annotation is usable only some, but not all, modes.

12. The non-transitory computer readable storage medium storing the program according to claim 8, which, when executed by the computer, causes the computer to further perform operations including:
  causing the display unit to display the remaining amount of available electric power; and
  updating the displayed remaining amount of available electric power in response to the selection of the displayed at least one usable power load.

13. The non-transitory computer readable storage medium storing the program according to claim 8, which, when executed by the computer, causes the computer to further perform an operation of causing the display unit to display a ratio of a remaining amount of available power consumption to an upper limit value of the available power consumption in the consumer facility.

14. The non-transitory computer readable storage medium storing the program according to claim 8, wherein:
  the control device is a mobile terminal;
  the control device includes an imaging unit; and
  the non-transitory computer readable storage medium stores the program, which, when executed by the computer, causes the computer to further perform operations of
    associating a power load captured by the imaging unit with the predicted power consumption stored in the memory,
    determining whether the power load captured by the imaging unit is usable based on the remaining amount of available electric power and the predicted power consumption of the power load captured by the imaging unit, and
    using an augmented reality function to superimpose, on an image of the power load captured by the imaging unit, information indicating whether the power load captured by the imaging unit is usable.

15. A control method executed by a control device that is connected to power loads installed in a consumer facility so as to be communicable with the power loads, the control method comprising:
  determining the power loads based on the connection with the power loads;
  associating each power load of the power loads with predicted power consumption stored in a memory, the predicted power consumption defined as a power consumption predicted when said power load of the power loads is used;
  calculating a remaining amount of available electric power based on a difference between currently used electric power and a predetermined value of available electric power in the consumer facility;
  determining at least one usable power load out of the power loads based on the remaining amount of available electric power in the consumer facility and the predicted power consumption;

causing the display unit to display the at least one usable power load such that the at least one usable power load is selectable; and in response to receiving a selection of the displayed at least one usable power load, controlling the selected at least one usable power load.

16. The control method according to claim 15, further comprising causing the display unit to display the at least one usable power load and an annotation regarding the at least one usable power load in association with each other.

17. The control method according to claim 16, wherein the annotation includes an indication prompting the use of the at least one usable power load associated with the annotation.

18. The control method according to claim 16, wherein the annotation includes an indication that the at least one usable power load associated with the annotation is usable only some, but not all, modes.

19. The control method according to claim 15, further comprising:

causing the display unit to display the remaining amount of available electric power; and updating the displayed remaining amount of available electric power in response to the selection of the displayed at least one usable power load.

20. The control method according to claim 15, further comprising causing the display unit to display a ratio of a remaining amount of available power consumption to an upper limit value of the available power consumption in the consumer facility.

* * * * *